(12) United States Patent
Dunn et al.

(10) Patent No.: US 8,464,661 B1
(45) Date of Patent: Jun. 18, 2013

(54) AUTOMATED ANIMAL WATERING APPARATUS

(76) Inventors: Theresa J. Dunn, Grand Junction, CO (US); Sylas B. Ashton, Socorro, NM (US); Seth J. Ashton, Grand Junction, CO (US)

( * ) Notice: Subject to any disclaimer, the term of this patent is extended or adjusted under 35 U.S.C. 154(b) by 110 days.

(21) Appl. No.: 13/184,513

(22) Filed: Jul. 16, 2011

Related U.S. Application Data

(63) Continuation of application No. 12/206,080, filed on Sep. 8, 2008, now abandoned.

(60) Provisional application No. 60/970,561, filed on Sep. 7, 2007.

(51) Int. Cl.
  *A01K 7/00* (2006.01)
  *A01K 7/02* (2006.01)

(52) U.S. Cl.
  USPC ............................................................. 119/73

(58) Field of Classification Search
  USPC .................. 119/51.5, 72, 72.5, 73–74, 77–81
  See application file for complete search history.

(56) References Cited

U.S. PATENT DOCUMENTS

| | | | |
|---|---|---|---|
| 2,585,698 A | 2/1952 | Spring | |
| 3,324,834 A | 6/1967 | McKinstry | |
| 3,650,247 A * | 3/1972 | McKinstry | 119/81 |
| 4,281,625 A | 8/1981 | Kasai | |
| 4,470,371 A | 9/1984 | Strickland | |
| 4,509,460 A * | 4/1985 | Seltzer | 119/74 |
| 4,584,966 A * | 4/1986 | Moore | 119/73 |
| 4,628,867 A | 12/1986 | Brougham et al. | |
| 4,630,569 A | 12/1986 | Dieleman | |
| 4,655,171 A | 4/1987 | Tomasovich | |
| 4,704,991 A * | 11/1987 | Moore | 119/73 |
| 4,883,022 A * | 11/1989 | Barker | 119/73 |
| 4,986,221 A * | 1/1991 | Shaw | 119/73 |
| 5,105,771 A | 4/1992 | Schafer | |
| 5,174,245 A * | 12/1992 | Bishop | 119/73 |
| 5,452,683 A * | 9/1995 | Poffenroth | 119/73 |
| 6,910,444 B1 | 6/2005 | Soppe | |
| 7,423,243 B2 | 9/2008 | Reusche et al. | |
| 7,762,211 B1 * | 7/2010 | McDaniel | 119/51.5 |

\* cited by examiner

*Primary Examiner* — David Parsley

(57) ABSTRACT

An automated animal watering apparatus having an inlet-outlet aperture disposed within a recessed repository, a first water sensor, a second water sensor, a combined pipe with an inlet portion and an outlet portion; the inlet portion operationally connected to an extant faucet, the outlet portion operationally communicating with an extant drainage; a heater plate, a temperature sensor, a drain pump, and a central processing unit controlling the device; wherein the central processing unit operationally communicates with the sensors, inlet valve, and drain pump, to maintain a water level within the repository, a water temperature between determined norms, and engages a preprogrammed flushing cycle by alternately activating and deactivating the drain pump.

8 Claims, 5 Drawing Sheets

US 8,464,661 B1

AUTOMATED ANIMAL WATERING APPARATUS

CROSS-REFERENCE TO RELATED APPLICATIONS

U.S. Utility patent application Ser. No. 12/206,080 filed on Sep. 8, 2008 U.S. Provisional Application No. 60/970,561 filed on Sep. 7, 2007

FEDERALLY SPONSORED RESEARCH OR DEVELOPMENT

Not Applicable

INCORPORATION BY REFERENCE OF MATERIAL SUBMITTED ON A COMPACT DISK

Not Applicable

TO ALL WHOM IT MAY CONCERN

Be it known that we, Theresa J. Dunn, Sylas B. Ashton, and Seth J. Ashton, all citizens of the United States of America, have invented a new and useful automated animal watering apparatus of which the following is a specification. We claim benefit of our U.S. Utility patent application Ser. No. 12/206, 080 filed on Sep. 8, 2008 and our U.S. Provisional Application No. 60/970,561 filed on Sep. 7, 2007.

BACKGROUND OF THE INVENTION

Various automated animal watering devices are known in the prior art; however, what is needed is an automated animal watering apparatus having an inlet-outlet aperture disposed within a recessed repository, a first water sensor, a second water sensor, a combined pipe with an inlet portion and an outlet portion; said inlet portion operationally connected to an extant faucet, said outlet portion operationally communicating with an extant drainage; a heater plate, a temperature sensor, a drain pump, and a central processing unit; wherein said central processing unit operationally communicates with said sensors, inlet valve, and drain pump, to maintain a water level within the repository, a water temperature between determined norms, and engages a preprogrammed flushing cycle by alternately activating and deactivating the drain pump.

FIELD OF THE INVENTION

The present invention relates generally to animal accessories and, more specifically, to an automated animal watering apparatus.

SUMMARY OF THE INVENTION

The general purpose of the automated animal watering apparatus, described subsequently in greater detail, is to provide an automated animal watering apparatus which has many novel features that result in an improved automated animal watering apparatus which is not anticipated, rendered obvious, suggested, or even implied by prior art, either alone or in combination thereof.

The present automated animal watering apparatus has been devised for use predominantly with household pets, such as cats and dogs. However, certain novel features of the device, as disclosed in this specification, are not limited to watering apparatuses used for household pets and may be applicable for larger quadrupeds such as herd animals.

It is often problematic for pet owners to keep a clean and ready supply of water on hand for animals. Cats especially can be finicky, and refuse to drink perceived dirty water. Therefore, a watering device that maintains a level of clean water automatically is preferable.

The present device includes an open-topped container with a base, an exterior wall extending upward from said base, an upper rim disposed atop the exterior wall, and an inner wall extending downward inwardly to adjoin a sloped surface. The inner wall and sloped surface define the limit of a recessed repository. An access panel is removably attached to the base. The sloped surface is disposed divergently parallel with respect to the access panel when said panel is installed to the base. The sloped surface is disposed between a maximum height and a minimum height with respect to the base. An inlet-outlet aperture, functioning as both a drain and an inlet for water, is disposed in the sloped surface, at the minimum height, proximal to the inner wall.

A cavity is disposed between the access panel, the exterior wall, and the inner wall. The cavity is accessible when the access panel is removed. This cavity houses a combined pipe. The combined pipe has an inlet portion and an outlet portion. The inlet portion is operationally connected to an extent faucet or water supply. The outlet portion operationally communicates with an extant drainage.

A T junction interconnects the inlet-outlet aperture and the combined pipe. An inlet valve is disposed in the inlet portion of the combined pipe, the inlet valve disposed upstream of the T junction. A drain pump is disposed in the outlet portion of the combined pipe, the drain pump is disposed downstream of the T junction.

A first water sensor is disposed in the inner wall proximal the upper rim. A second water sensor is disposed in the inner wall proximal the inlet-outlet aperture. A central processing unit is in operational communication with these first and second water sensors. When the water level falls beneath the second water sensor, the central processing unit activates the inlet valve, and water is introduced to the recessed repository. When water is detected at the first water sensor, the central processing unit deactivates the inlet valve thereby maintaining a water level between the first and second water sensors.

The central processing unit is also in operational communication with the drain pump. The central processing unit activates the drain pump to drain the repository of water according to a predetermined flushing cycle as regulated by a timer. Thusly, water is emptied from the repository at a determined time, and a clean supply of water is subsequently inlet into the repository when the first water sensor detects the absence of water; the inlet valve thusly activated, and the repository refilled.

The present device also includes a heater plate. This heater plate is disposed within the cavity, in contact with the sloped surface. A temperature sensor is in operational communication with the central processing unit. When the water temperature in the repository falls to a predetermined activation temperature, the heater plate is activated to heat the water. When the water temperature reaches a predetermined deactivation temperature, the central processing unit deactivates the heater plate, and warming of the water ceases. Thusly, the water temperature may be regulated by means of the heater plate between a predetermined temperature range.

Also, if the temperature exceeds a predetermined activation temperature, the central processing unit will activate the flushing cycle and cooler water will then be introduced into the repository.

A filter screen is disposed over the inlet-outlet aperture to exclude debris (such as partially masticated food) from entering the combined pipe to prevent clogging or the build up of matter which may cause unsanitary conditions to prevail in the pipe.

Thus has been broadly outlined the more important features of the present automated animal watering apparatus so that the detailed description thereof that follows may be better understood and in order that the present contribution to the art may be better appreciated.

Objects of the present automated animal watering apparatus, along with various novel features that characterize the invention are particularly pointed out in the claims forming a part of this disclosure. For better understanding of the automated animal watering apparatus, its operating advantages and specific objects attained by its uses, refer to the accompanying drawings and description.

DETAILED DESCRIPTION OF THE DRAWINGS

Figure 1:
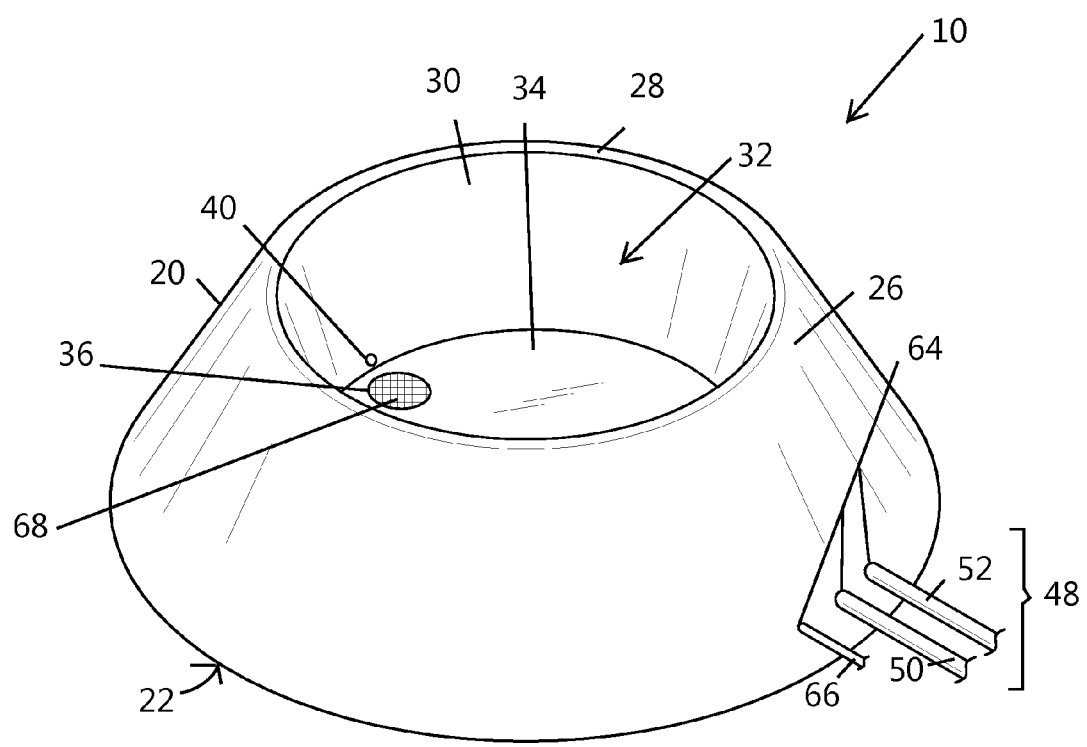
FIG. 1 is an isometric view.
Figure 2:
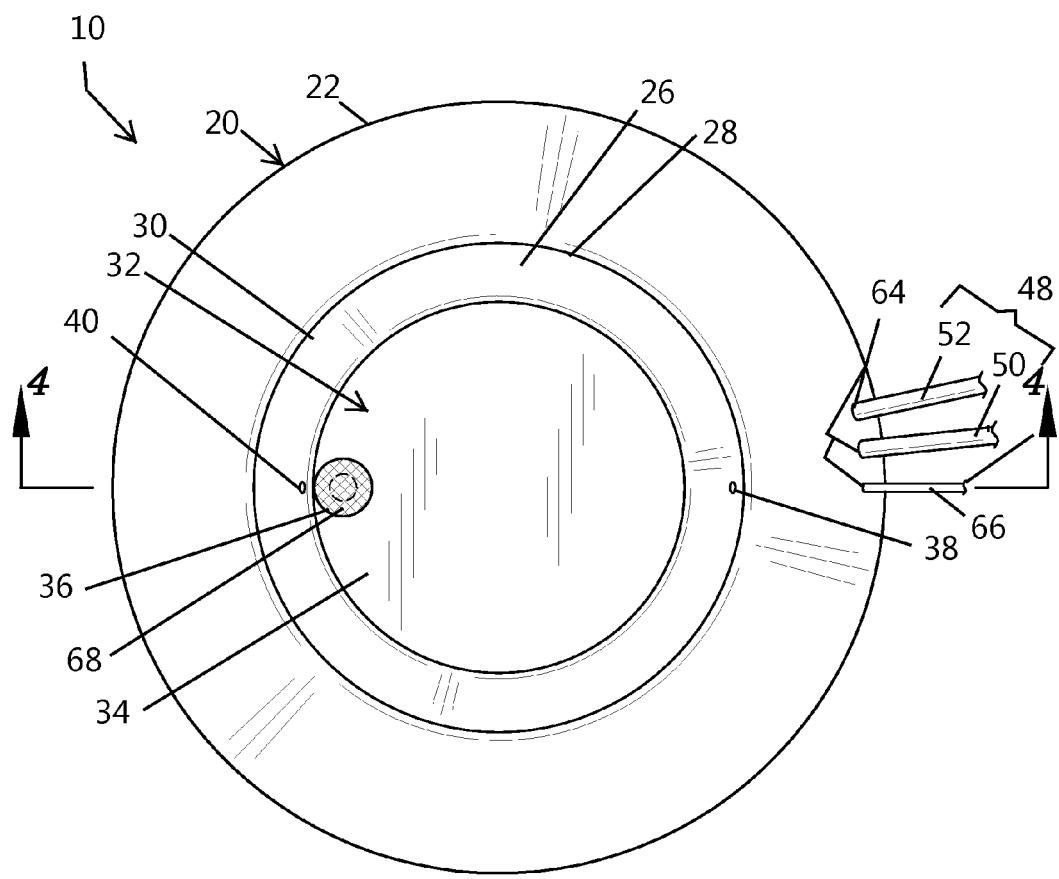
FIG. 2 is a top view.
Figure 3:
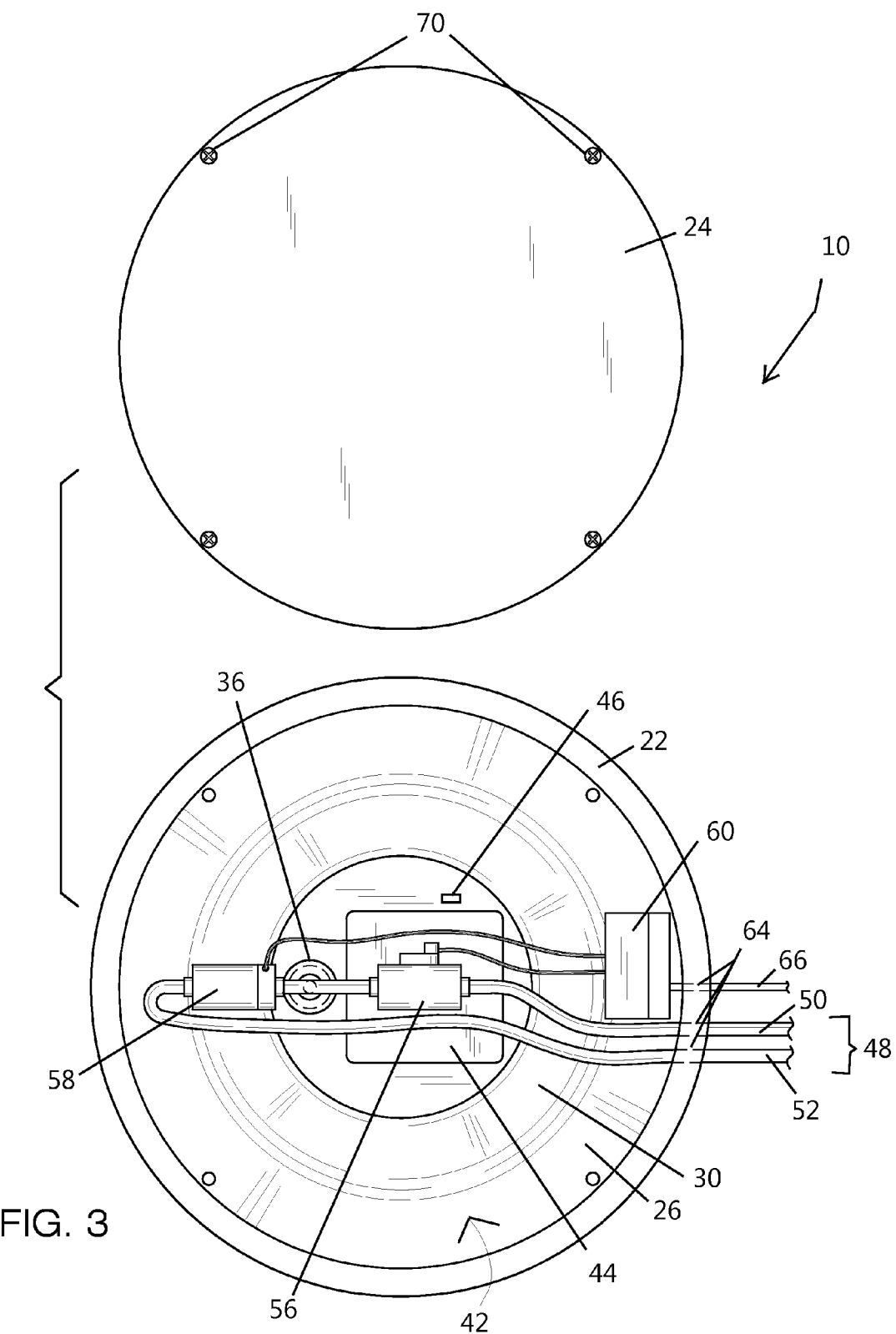
FIG. 3 is a bottom view.
Figure 4:
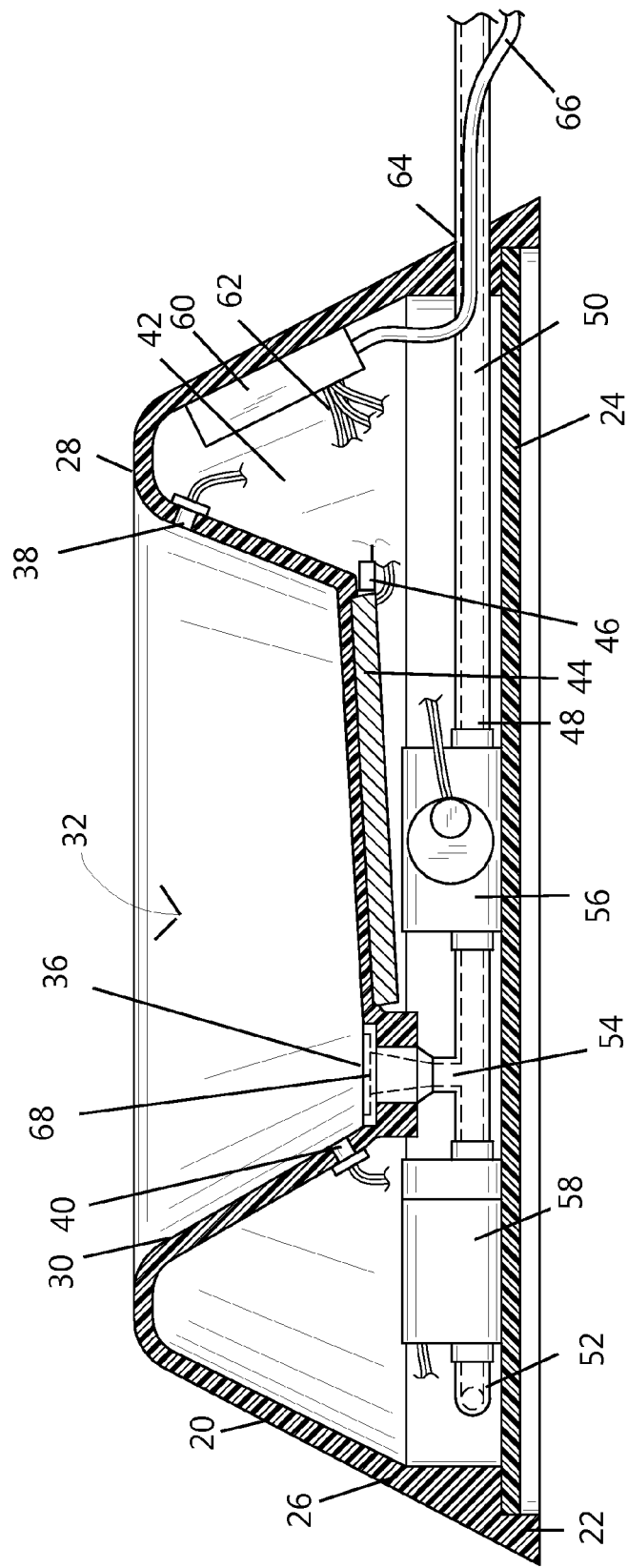
FIG. 4 is a cross section view taken along the line 4-4 of FIG. 2.
Figure 5:
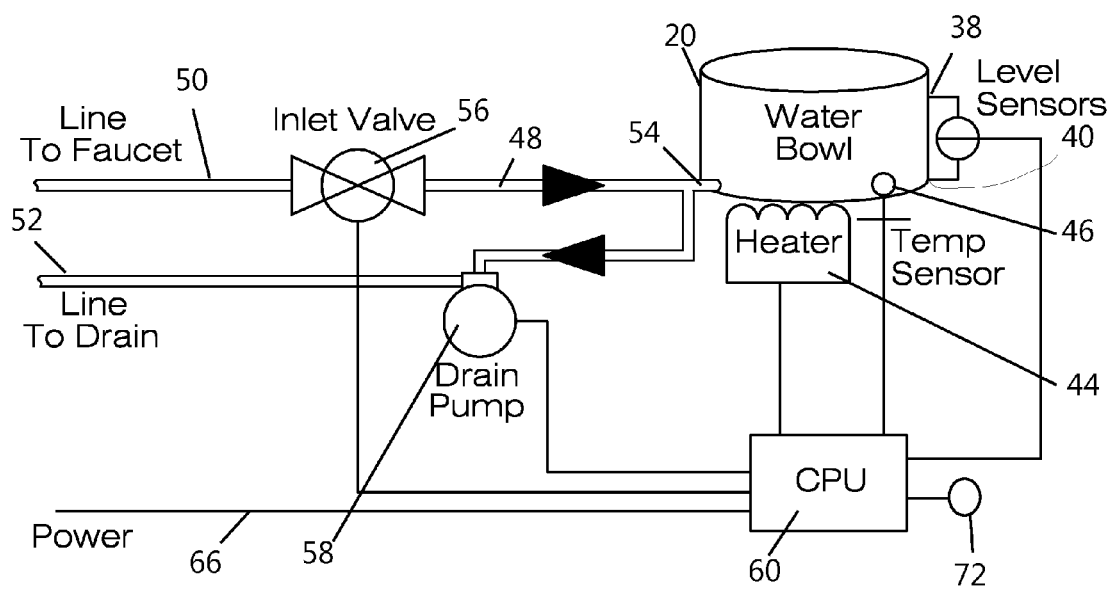
FIG. 5 is a schematic.

With reference now to the drawings, and in particular FIGS. 1 through 5 thereof, the principles and concepts of the automated animal watering apparatus generally designated by the reference number 10 will be described.

Referring to FIGS. 1 through 5 a preferred embodiment of the present automated animal apparatus 10 is illustrated.

The preferred embodiment of the automated animal watering apparatus 10 is configured to be used predominantly by domestic pets such as cats and dogs, and is not generally intended for large quadrupeds or herd animals. However, it is not intended that the device be limited exclusively for use with pets and animals in the home. Some of the features of the device as disclosed in this specification may be useable on a larger scale for watering larger herd animals, should such be desirable at manufacture.

The preferred embodiment of the instant device 10 is depicted herein with a generally frustroconical shape. However, it should be readily apparent in this specification that other shapes—such as square or polygonal shapes—are not necessary limited by this depiction.

The present automated animal watering apparatus 10 includes an open-topped container 20. This container 20 includes a base 22, an access panel 24 removably fastened to the base 22, and an exterior wall 26 extending upward from the base 24.

As is evident in the accompanying drawings, the exterior wall 26 laterally encloses the container 20.

The access panel 24 releasably attaches to the base 22 by means of a plurality of fasteners 70. The access panel 24 is disposed parallel with the ground when attached to the device 10.

An upper rim 28 is disposed atop the exterior wall 26. An inner wall 30 extends downward and inwardly from the upper rim 28. A recessed repository 32 is thusly laterally delimited by the inner wall 30. A sloped surface 34 is disposed at a lower limit within the repository 32, the sloped surface 34 divergently parallel with the installed access panel 24. The sloped surface 34 is continuously connected with the inner wall 30 and disposed between a maximum height and a minimum height with respect to the base 22.

A combined inlet-outlet aperture 36 is disposed in the sloped surface 34 at the minimum height, the inlet-outlet aperture 36 proximal the inner wall 30. A first water sensor 38 is disposed in the inner wall 30 proximal to the upper rim 28 and a second water sensor 40 is disposed in the inner wall 30 proximal to the inlet-outlet aperture 36.

A cavity 42 is disposed between the exterior wall 26, the inner wall 30, the access panel 24, and the sloped surface 34. This cavity 42 is accessible when the access panel 24 is removed. A heater plate 44 is disposed within the cavity, the heater plate 44 in contact with the sloped surface 34. A temperature sensor 46 is in operational communication with the heater plate 44.

A combined pipe 48 having an inlet portion 50 and an outlet portion 52 is disposed within the cavity 42. The combined pipe 48 runs parallel with the base 22, the inlet portion 50 operationally connected to an extant faucet (not shown) and the outlet portion 52 operationally communicating with an extant drainage (also not shown).

A T junction 54 interconnects the inlet-outlet aperture 36 and the combined pipe 48. An inlet valve 56 is disposed within the combined pipe 48, the inlet valve 56 disposed upstream of the T junction 54. A drain pump 58 is disposed within the combined pipe 48, the drain pump 58 disposed downstream of the T junction 54.

A central processing unit 60 is disposed within the cavity 42. The central processing unit 60 is in operational communication with the first water sensor 38, the second water sensor 40, the temperature sensor 46, the heating plate 44, the drain pump 58 and the inlet valve 56.

A plurality of wiring 62 is disposed within the cavity 42 interconnecting the central processing unit 60, the first 38 and second 40 water sensors, the temperature sensor 46, the heating plate 44, the drain pump 58 and the inlet valve 56. A plurality of apertures 64 is disposed in the exterior wall 26 proximal the base 22, the combined pipe 48 inlet portion 50, outlet portion 52, and a power cord 66 disposed therethrough.

The automated animal watering apparatus 10 thusly regulates a water level within the repository 32, said water level maintained between the first 38 and second 40 water sensors. When water in the repository 32 falls to a level detectable by the second water sensor 40 the inlet valve 56 is activated to inlet water into the repository 32, the water entering the repository through the inlet-outlet aperture 36.

When water is detected by the first water sensor 38 the inlet valve 56 ceases inletting water. Furthermore, the drain pump 58 is operationally activated to a programmable cycle by means of a timer 72 operationally communicating with the central processing unit 60 to flush the device 10 to a predetermined schedule, the water draining from the repository 32 through the inlet-outlet aperture 36. This programmable flushing cycle ensures a clean supply of water is maintained in the repository 32.

To lessen clogging within the combined pipe 48 and T junction 54 and exclude debris therefrom, a filter screen 68 is disposed over the inlet-outlet aperture, said filter screen 68 preventing coarse debris from draining through the device when the flushing cycle is activated.

The heater plate 44 is activated when the water temperature in the repository 32 falls to an activation temperature as relayed by the temperature sensor 46. This activation temperature is defined as a temperature above the freezing temperature of water. The heater plate 44 is deactivated when the water temperature in the repository 32 reaches a deactivation temperature as relayed by the temperature sensor 46. This deactivation temperature is defined as a temperature less than the temperature at which water boils.

What is claimed is:

1. An automated animal watering apparatus comprising:
an open-topped container comprising:
- a base;
- an access panel removably fastened to the base;
- an exterior wall extending upward from the base, the exterior wall laterally enclosing the container;
- an upper rim disposed atop the exterior wall;
- an interior wall extending downward and inwardly from the upper rim;
- a recessed repository laterally delimited by the interior wall;
- a sloped surface disposed within the repository, the sloped surface divergently parallel with the access panel, the sloped surface continuously connected with the interior wall and disposed between a maximum height and a minimum height with respect to the base;
- a combined inlet-outlet aperture disposed in the sloped surface at the minimum height, the inlet-outlet aperture proximal the inner wall;
- a first water sensor disposed in the inner wall proximal to the upper rim;
- a second water sensor disposed in the inner wall proximal to the inlet-outlet aperture;
- a cavity disposed between the exterior wall, the inner wall, the access panel, and the sloped surface;
- a heater plate disposed within the cavity, the heater plate in contact with the sloped surface;
- a temperature sensor in operational communication with the heater plate;
- a combined pipe having an inlet portion and an outlet portion disposed within the cavity parallel with the base, the inlet portion operationally connected to an extant faucet and the outlet portion operationally communicating with an extant drainage;
- a T junction interconnecting the inlet-outlet aperture and the combined pipe;
- an inlet valve disposed within the combined pipe, the inlet valve disposed upstream of the T junction;
- a drain pump disposed within the combined pipe, the drain pump disposed downstream of the T junction;
- a central processing unit disposed within the cavity, the central processing unit in operational communication with the first water sensor, the second water sensor, the temperature sensor, the heating plate, the drain pump, the inlet valve, and a timer;
- a plurality of wiring interconnecting the central processing unit, the first and second water sensors, the temperature sensor, the heating plate, the drain pump and the inlet valve;
- a plurality of apertures disposed in the exterior wall proximal the base, the combined pipe inlet portion, outlet portion, and a power cord disposed therethrough;

wherein the automated animal watering apparatus regulates a water level within the repository, said water level maintained between the first and second water sensors; the inlet valve inletting water when the water falls to a level detectable by the second water sensor and the inlet valve ceasing inletting water when water is detected by the first water sensor; the drain pump is operationally activated on a programmable cycle to flush the device to a predetermined schedule.

2. The automated animal watering apparatus of claim 1 wherein the heater plate is activated when the water temperature in the repository falls to an activation temperature as relayed by the temperature sensor.

3. The automated animal watering apparatus of claim 1 wherein a filter screen is disposed over the inlet-outlet aperture.

4. The automated animal watering apparatus of claim 1 wherein the access panel is attachable to the base be means of a plurality of fasteners.

5. The automated animal watering apparatus of claim 2 wherein the heater plate is deactivated when the water temperature in the repository reaches a deactivation temperature as relayed by the temperature sensor.

6. The automated animal watering apparatus of claim 4 wherein the fasteners are screws.

7. The automated animal watering apparatus of claim 6 wherein the base is circular and the exterior wall is generally frustroconical in shape.

8. The automated animal watering apparatus of claim 2 wherein the drain pump is operationally activated at a predetermined temperature to flush the device.

\* \* \* \* \*